No. 640,198. Patented Jan. 2, 1900.
W. K. HOAGLAND.
WHEEL.
(Application filed Oct. 14, 1899.)
(No Model.)
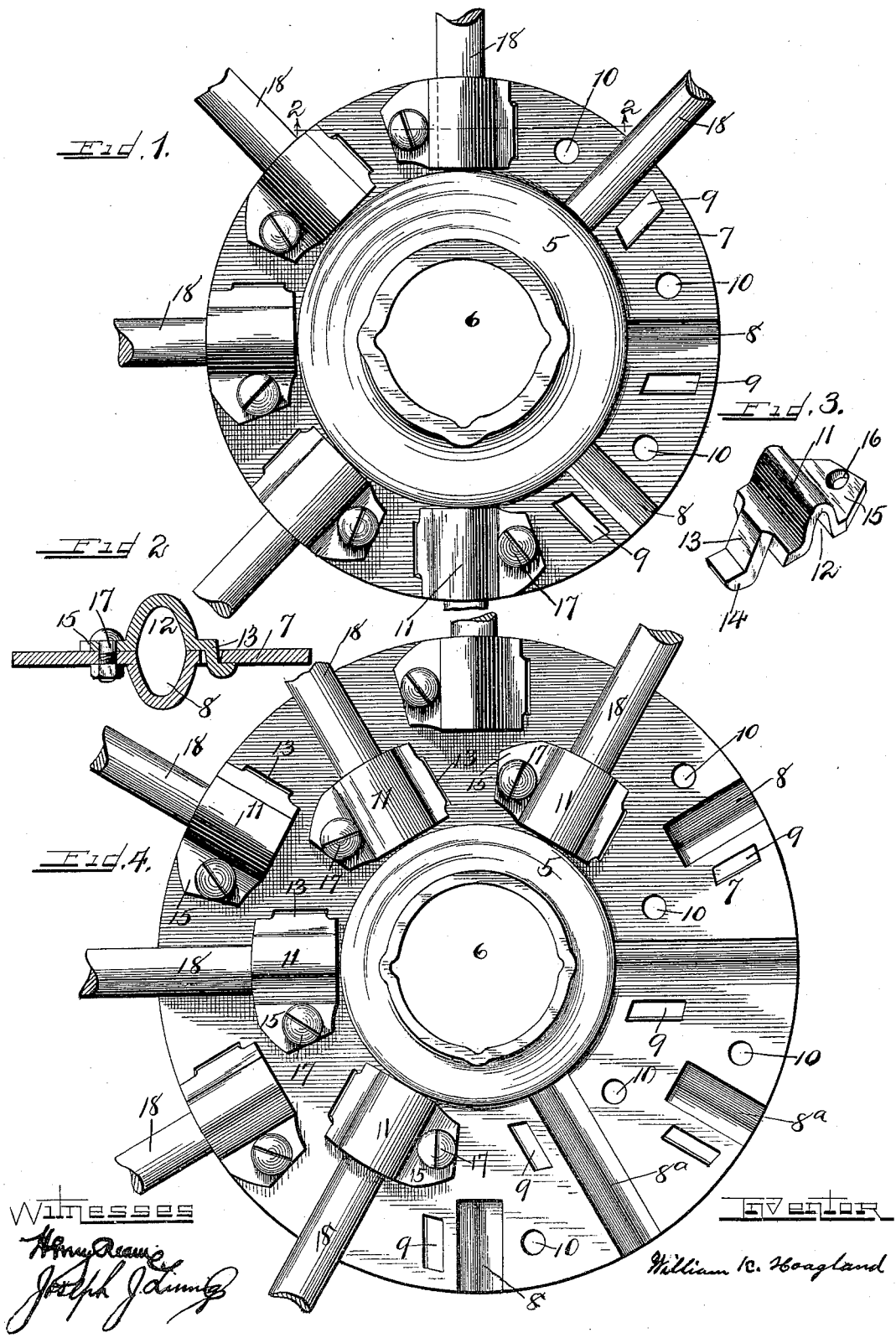
Witnesses
Inventor
William K. Hoagland

UNITED STATES PATENT OFFICE.

WILLIAM K. HOAGLAND, OF PERU, ILLINOIS.

WHEEL.

SPECIFICATION forming part of Letters Patent No. 640,198, dated January 2, 1900.

Application filed October 14, 1899. Serial No. 733,582. (No model.)

*To all whom it may concern:*

Be it known that I, WILLIAM K. HOAGLAND, a citizen of the United States, residing at Peru, in the county of La Salle and State of Illinois, have invented certain new and useful Improvements in Wheels, of which the following is a specification, reference being had to the accompanying drawings.

My invention relates to improvements in wheels, and particularly to wheels which are formed wholly of metal. Heretofore it has been usual in wheels of this class to connect the spokes with the hub in such a way that it is difficult to remove them, and in case a spoke becomes broken the wheel is rendered useless.

It is one of the objects of my invention to make a metal wheel in which the spokes may be so secured to the hub that in case one of them is broken it may be readily detached and a new spoke put in its place.

Another object of my invention is to provide a new and improved hub particularly adapted for use in metal wheels, to which the spokes may be firmly secured, but at the same time so secured that they may be easily detached therefrom.

Another object of my invention is to provide a new and improved device for clamping the ends of spokes to the hub of a wheel so that they may be easily detached therefrom in case they become broken.

I attain these objects as hereinafter specified and as illustrated in the drawings.

That which I regard as new will be set forth in the claims.

In the drawings, Figure 1 is a side view of a hub with portions of several spokes attached, the spokes being broken away a short distance from the hub. Fig. 2 is a detail, being a section on line 2 2 of Fig. 1. Fig. 3 is a detail, being a view of the clamp by which the spokes are secured to the hub; and Fig. 4 shows a modification, being a side view of the hub of a wheel with several spokes attached and broken away a short distance from the hub.

Referring to the drawings, 5 indicates a central boss, which is provided with an opening 6, adapted to receive the end of an axle. 7 indicates a circumferential circular plate, which is preferably formed integral with the boss 5.

8 indicates grooves formed in the plate 7, extending from the circumference toward the center of the hub and of such shape as to form one half of a socket to receive the end of a spoke, the other half being formed by the clamping device hereinafter described.

9 indicates openings in the hub placed one upon one side of each of the grooves 8 and adapted to receive a lug on the clamp hereinafter described.

10 indicates openings in the plate 7, adapted to receive a bolt hereinafter described.

11 indicates the clamp, which is formed with a recess 12, which corresponds in shape with the grooves 8 and is adapted when the clamp 11 is placed in position to register with the groove 8, so as to form a socket for the end of the spoke.

13 indicates a lug formed upon the clamp 11 and having at its end a bent portion 14, which forms a shoulder adapted to engage with the surface of the plate 7 opposite to the surface upon which the clamps are placed. The lug 13 is adapted to enter the opening 9, whereby the clamp is pivotally engaged at one end with the plate or flange 7. 15 indicates a shoulder formed upon the other side of the clamp from the lug 13, which is provided with an opening 16, adapted to receive a bolt 17.

18 indicates spokes, the ends of which are adapted to fit the sockets formed by the clamps 11 and the grooves 8 in the plate when the clamps 11 are placed in position.

In putting the wheel together the lug 13 is inserted through the opening 9, the end of the spoke 18 placed in the socket, which is formed by the registering of the recess in the clamp 11 with the groove 8, and the clamp 11 is tightly clamped upon the spoke by means of the bolt 17.

It will be obvious that the clamp 11 constitutes a species of lever which at one end pivotally engages the flange or plate 7 and by means of the bolt 17 is drawn down upon the spoke when in position, so as to tightly bind the spoke in the socket and firmly secure it to the hub.

In the modification shown in Fig. 4 I have shown a form of hub in which a greater number of spokes may be used. In this form the circular plate 7 is made larger and with a greater number of grooves. The grooves $8^a$ extend from the periphery of the plate 7 to the central boss, and between them are grooves $8^b$, which extend only a portion of the distance from the periphery of the plate 7 toward the boss 5, thus affording room for the clamping upon the hub of a greater number of spokes. The clamping devices are the same as above described.

That which I claim as my invention, and desire to secure by Letters Patent, is—

1. A hub provided with a circumferential flange having grooves forming each one half of a spoke-socket and with clamping-levers adapted at one end to pivotally engage said flange at one side of said groove, and having each a recess forming the other half of a spoke-socket, and with means for forcing the other end of said clamping-levers down toward and securing the same to said hub, substantially as described.

2. In a wheel, the combination with spokes, and a hub having grooves adapted each to form one half of a spoke-socket, of clamping-levers adapted at one end to pivotally engage said hub and provided each with a groove forming the other half of a spoke-socket, and means for securing the other end of said clamping-levers to said hub, substantially as described.

3. In a wheel, the combination with spokes, and a hub having grooves forming each one half of a spoke-socket, of clamping-levers adapted at one end to pivotally engage said hub and having each a recess adapted to coact with one of said grooves and form the other half of a spoke-socket, and means for forcing the other end of said clamping-levers toward and securing the same to said hub, substantially as described.

4. In a wheel, the combination with spokes, and a hub provided with a circumferential flange having grooves forming each one half of a spoke-socket, of clamping-levers adapted at one end to pivotally engage said hub and having each a recess adapted to coact with one of said grooves and form the other half of a spoke-socket, and means for forcing the other end of said clamping-levers toward and securing the same to said hub, substantially as described.

5. In a wheel, the combination with spokes, of a hub having a circular plate provided with grooves and openings beside said grooves, clamps provided each with a recess adapted to register with said grooves and form a spoke-socket, and with a lug at one end adapted to enter said openings and engage said plate, and devices for securing the other end of said clamp to said plate, substantially as described.

WILLIAM K. HOAGLAND.

Witnesses:
HENRY REAM,
JOSEPH J. LINNIG.